March 14, 1967   W. ROTH   3,308,653
VIBRATION TONOMETER
Filed Aug. 16, 1963

INVENTOR
WILFRED ROTH
BY Joseph G. Houghton
ATTORNEY

United States Patent Office 3,308,653
Patented Mar. 14, 1967

3,308,653
VIBRATION TONOMETER
Wilfred Roth, West Hartford, Conn., assignor to the United States of America as represented by the Secretary of the Department of Health, Education, and Welfare
Filed Aug. 16, 1963, Ser. No. 305,916
4 Claims. (Cl. 73—80)

This invention relates to the measurement of intraocular pressure and aims to provide vibration tonometer means and methods for effecting such measurement.

The invention aims to provide vibration tonometer means including a method and apparatus capable of measuring intraocular pressure without gross deformation of the eye; to provide tonometer means by which measurements indicative of the intraocular pressure may be made without introducing significant increase of such pressure; to provide tonometer means of desirable sensitivity and reliability; to provide tonometer means capable of obtaining an accurate reading in a short period of time of the order of one or a few seconds; to provide tonometer means having a relatively wide tolerance as regards its placement relative to the eye; and to provide new and useful details and sub-combinations and combinations of method and apparatus contributing to the realization of the foregoing objects. The invention resides in the new and useful features and combinations of method and apparatus hereinafter described and is more particularly pointed out in the appended claims.

Figure 1:
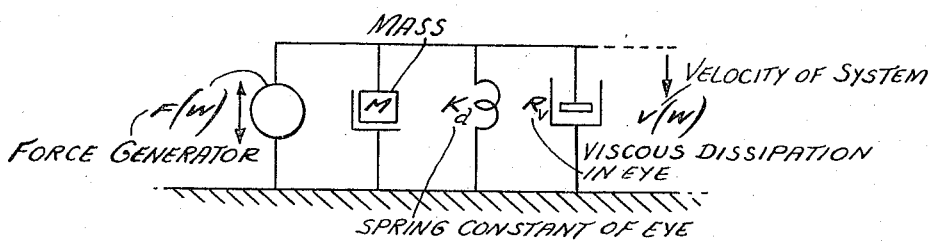
Figure 2:
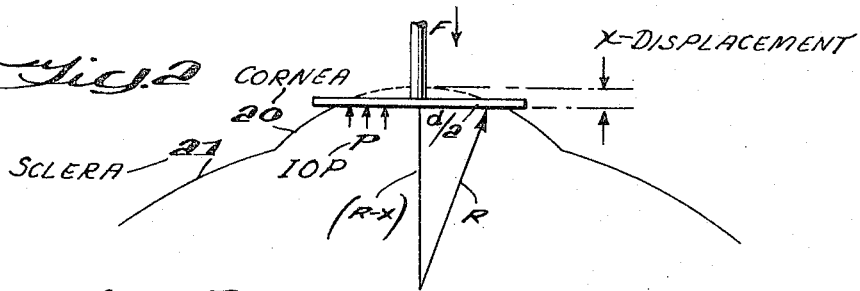
Figure 3:
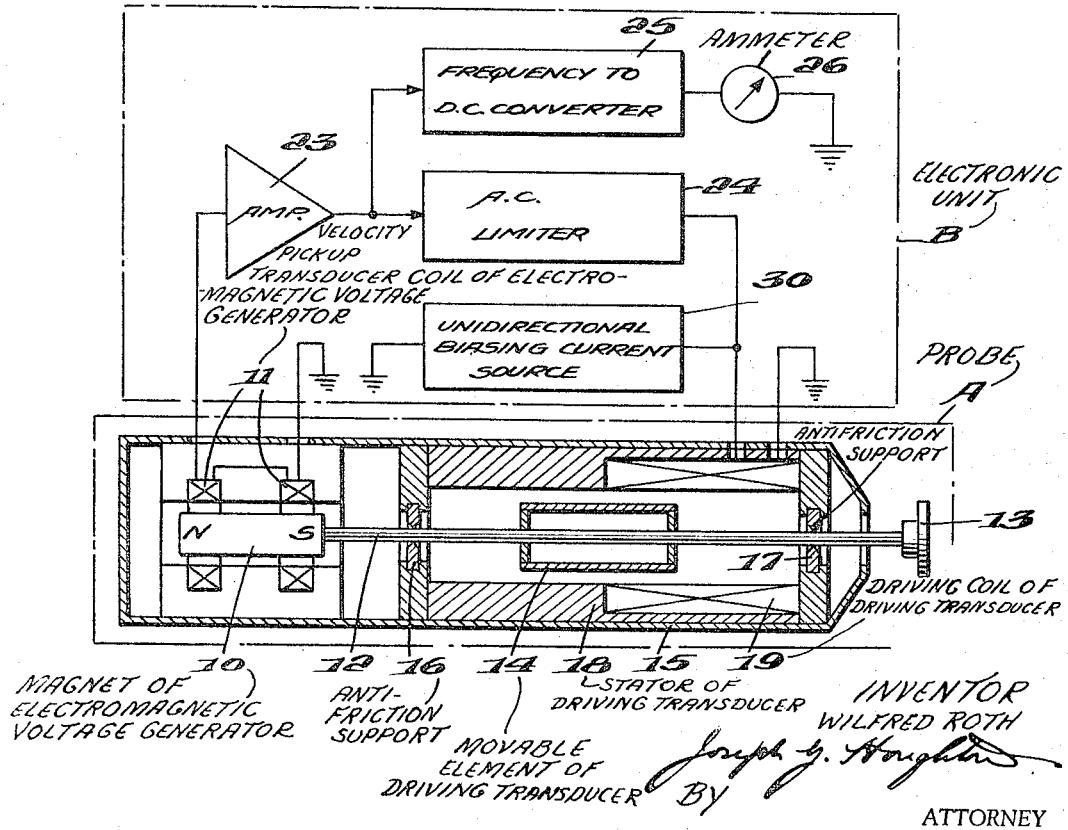

In the accompanying drawings forming a part of the present specification:

FIGS. 1 and 2 are diagrams for facilitating an explanation of the invention, FIG. 1 being a simplified lumped constant equivalent mechanical circuit of a vibrating mass in contact with the eye, and FIG. 2 being a diagram illustrating the geometry resulting when the vibration tonometer contacts the cornea of the eye, and FIG. 3 is a diagram of a probe according to the invention with a block diagram of suitable circuitry usable therewith for practicing the invention.

To facilitate an understanding of the invention the present specification is divided into sections: (I) an introductory description of the problems met and the prior art attempts to meet them, followed by (II) and (III) a discussion of the principles on which the new tonometer is based and then (IV) by a more detailed description of the present invention.

(I) *Introduction*

The tissues of the eye are normally flexible and elastic. Structural stability is provided by fluid under pressure within the globe. This pressure, termed the intraocular pressure or IOP, is usually maintained reasonably constant over extended periods of time by a balanced flow of fluid into and out of the eye. In the normal eye, the IOP is in the range of 15 to 25 mm. Hg. When the balance of the fluid flow is upset by either anatomical or functional defects, the IOP can change radically. A pressure rise of 3 or 4 times normal is not uncommon. Prolonged high pressure, such as occurs in glaucoma, results in the destruction of the optic nerve and retina, causing blindness. Because the symptoms of glaucoma are often mild and transitory, early detection depends on the measurement of IOP by devices called tonometers. If diagnosis is made before substantial damage occurs, continued degeneration and subsequent blindness can be prevented by controlling the intraocular pressure with drugs or surgery.

As early as 1860 it was recognized that glaucoma was characterized by increased IOP but it took more than 40 years to devise a useful instrument for pressure measurement. The early workers generally either pushed a plunger against the cornea and attempted to determine the indentation or measured the area of applanation when a plane surface was pressed against the eye.

In 1905, Hjalmar Schiotz published a calibration scale for the instrument which he invented and which now bears his name. The Schiotz tonometer introduced a new concept by allowing a curved footplate to rest on the surface of the cornea and a plunger, advancing through the footplate, to indent the cornea. Through the action of simple levers, the depth of indentation is indicated on a scale. The Schiotz tonometer gained rapid acceptance and is the most widely used instrument today. The instruments of Gradle, McLean and Bailliart are mechanical variations of the Schiotz which introduce no new concepts. Electronic variations of these instruments have been devised but have resulted in no vast improvements. The Schiotz tonometer has limited accuracy by virtue of defects in both the instrument and the measuring technique. The force of the basic 16.5 gm. mass of the Schiotz against the cornea causes gross deformation which increases the IOP significantly, often by a factor of two or more. Thus, the measurement is made with the eye in other than its normal condition. Variations in corneal thickness, radius of curvature and resistance to deformation introduce significant, sometimes gross errors. The error in reading the scale alone amounts to ±10%.

(II) *Theory of the vibration tonometer*

Intraocular pressure is closely associated with an effective spring constant of the eye. The Schiotz and other tonometers measure this statically, requiring gross deformation of the cornea. Applicant's studies have revealed that this spring constant can be measured dynamically without increasing the IOP significantly if displacements are kept small. FIGURE 1 is a simplified lumped constant equivalent mechanical circuit of a vibrating mass in contact with the eye in which:

$M$=mass of the vibration probe assembly and dynamic mass of the eye
$K_d$=effective spring constant of the eye
$R_v$=viscous dissipation in the eye
$V(w)$=velocity of the system
$F(w)$=force generator Since the spring constant and viscous losses of the vibration probe which has been developed are negligible they are not considered here. For a small vibration amplitude, the dynamic mass of the eye is small compared to the mass of the probe.

If an oscillating force $F(w)$ is applied across the network terminals, the velocity, $V(w)$, is a measure of the system response. By varying the frequency of the force generator and by measuring the response, the values of the circuit elements can be obtained. Since the network is a simple resonant system, conventional velocity and phase response vs. frequency plots are applicable. Since M is known if the effective dynamic mass of eye is small compared to that of the probe, an accurate evaluation of $K_d$ can be made by measuring the resonant frequency of the system. Knowledge of the effective spring constant, $K_d$, leads, in turn, to the measurement of IOP.

(III) *Dynamic spring constant of the eye*

Goldmann and Schmidt derived and experimentally verified equations for a static applanation Tonometer in which a small area of the cornea is flattened by a plane surface. A simple derivation, neglecting surface tension forces due to tears and cornea bending forces follows. By inspection of FIG. 2, wherein:

$d/2$=radius of flattened area
$R$=radius of curvature of cornea
$x$=displacement of cornea
$F$=force necessary for flattening $A$ = area of contact = $\pi(d/2)^2$
$P$ = the intraocular pressure being measured.

We find that by the Pythagorian Theorem for right triangles $$R^2 = (R-x)^2 + (d/2)^2 \quad (a)$$

whence $$(d/2)^2 = R^2 - (R-x)^2 \quad (b)$$

also from the fact that the applied force F, acting downwardly, is balanced by the force P per unit of area, acting upwardly on the area of contact, we find that:

$$F = AP \quad (c)$$

whence $$F = \pi(d/2)^2 \cdot P$$

whence $$F = \pi[R^2 - (R-x)^2] \cdot P$$

whence $$F = \pi(2Rx - x^2) \cdot P \quad (d)$$

For measurement on a dynamic basis, the slope (first derivative) of the force-displacement curve is of interest. If we define the dynamic spring constant as $$K_d = dF/dx \quad (e)$$

then from Equation $d$ $$\frac{dF}{dx} = \pi(2R - 2x)P$$

whence $$\frac{dF}{dx} = 2\pi P(R-x)$$

whence $$K_d = 2\pi P(R-x) \quad (f)$$

Then for a measuring technique using small displacements $x$ compared to the value of R, the value of $x$ in Equation $f$ becomes insignificant and the relation is obtained that $$K_d \text{ is essentially equal to } 2\pi PR \quad (g)$$

From this relationship $(g)$, since the resonant frequency of a vibration tonometer $W_0^2 = K_d/M$, we find $$W_0^2 = 2\pi PR/M$$

A significant variation in resonant frequency can be obtained as a function of IOP but there is also a similar dependence on the radius of curvature of the cornea. In the general population, the variation in corneal radius is quite small so only small errors will be introduced. In those cases where the corneal radius of curvature is markedly different from normal, the radius can be determined by other means and the reading corrected. In any case applicant has found that the dependence of the vibration tonometer on corneal curvature is considerably less for most radii and pressures than the Schiotz. For the vibration tonometer, the correction for R is independent of IOP while, with the Schiotz, the correction for R is a complicated function of IOP.

The neglected surface tension and bending forces have been evaluated by Goldmann and Schmidt. These factors increase the complexity of the final equation but do not grossly affect the results given above on the basis of the simplified derivation.

(IV) *Detailed description*

The vibration tonometer, in the form shown in FIG. 3, is safe, accurate, portable, convenient to use, and rugged. Only small forces are generated in order that changes of IOP and corneal or scleral deformation may be negligible. The instrument, in the form shown in FIG. 3 comprises a probe A and a small electronic unit B. The probe A, designed to be hand held, contains an electromagnetic voltage generator illustrated as a movable magnet 10 and a velocity pick-up transducer coil means 11 juxtaposed to said movable magnet. Said movable magnet 10 is mounted on a hollow steel shaft 12, which may be similar to a hypodermic needle tube, and which is provided with a flat tip 13 on one end and a transducer element 14 in spaced relation to said magnet 10. The armature consisting of the elements 10, 12, 13 and 14 is mounted axially within the probe case 15. This armature, supported by anti-friction, e.g. ruby or like jewel, bearings 16 and 17, is free to move axially within the limits set by mechanical stops with very low friction. The driving transducer comprises the movable core element 14 shown in the form of a thin iron sleeve, the soft iron stator body 18 and the elongated transducer coil 19. The driving and pickup transducers, as shown, are designed to provide constant force and sensitivity, respectively, over a wide range of axial positions of the probe shaft assembly, thus increasing the tolerance in the placing of the instrument in contact with the eye. Measurements are made by resting the plastic tip 13 (shown as a ¼" diameter applanating disc) at the end of the shaft against the cornea 20 or sclera 21 (see FIG. 2). The velocity pick-up coil means 11 develops a voltage proportional to the velocity of the movement of magnet 10 which is proportional to the velocity of movement of the surface 20 or 21 contacted by the tip 13. This signal is amplified by a high gain transistor amplifier 23, is limited to a predetermined amplitude by limiter 24, and is applied to the driver coil 19 as regenerative feedback. The system oscillates at the resonant frequency determined primarily by the predetermined mass of the probe armature 10, 12, 13, 14 and the dynamic spring constant of the eye. Frequency measuring circuits, illustrated as comprising a conventional converter 25, display the reading on a microammeter 26.

The force transducer 19 is also energized from a unidirectional biasing current source 30, and thus generates a unidirectional or D.C. component of force with a superimposed oscillating or A.C. component of force at the resonance frequency of the system. The D.C. force component exceeds the maximum excursion of the A.C. component and thus insures that the applanating tip 13 remains in contact with the surface of the eye during the oscillation. The average force, which need not exceed 1.5 grams, raises the IOP less than 0.5 mm. Hg. Over the extremes of IOP, the resonant frequency may be made to vary over a selected range, by appropriate selection of the mass of the armature within the range of about 0.5 to 5.0 grams, e.g. from 30 to 300 cycles per second. Since the driver is a constant velocity generator, i.e. has the limiter 24 to limit the maximum excursions of the alternating component applied to the driver coil and hence the peak forces developed by that coil while the dissipation constant of the eye is relatively uniform, the amplitude of vibration is an inverse function of frequency for a particular dissipation of the eye. At 100 cycles per second the peak-to-peak displacement may be approximately 0.08 mm.

Analysis of data obtained with a probe of this nature indicates that the resonance frequency of the eye-probe mechanical system is proportional to (Pressure+Constant)$^{½}$. The constant in this expression is due to the effects of a small internal spring constant within the probe and to surface tension.

The vibration tonometer as herein disclosed is an accurate instrument to measure intraocular pressure. The forces applied to the eye by the probe are so small that negligible change in pressure occurs during measurement. It is simple to use and the measurements obtained have proved to be reliable and reproduceable.

The invention is not limited to the particular embodiments herein set forth by way of example, which are to be taken as illustrated and not restricted of the invention, and various changes may be made without departing from the scope of the invention as defined in the appended claims. It will be appreciated by those skilled in the arts that when the probe A of the present invention is applied vertically to the eye, as illustrated in FIG. 2, the weight of the armature 10, 12, 13, 14 may afford the constant biasing force, in whole or in part. However, as it is desirable to keep the mass of the armature small, it is preferable to use some biasing force from the source 30 even in such circumstances. When the instrument is held horizontally for application to the eye, as in FIG. 3, a biasing force is applied from source 30 which exceeds the maximum excursion permitted by the limiter 24, and the mass of the armature acts only as an element determining the resonance frequency range of the instrument, and not as a biasing force. In the form shown the elements 10 and 14 of the armature are free of any external leads (such being confined to the stationary coils 11 and 19) and the armature constitutes a floatingly mounted member of predetermined mass formed to be placed against a generally spherical surface of the eye. The biasing means, shown as comprising the weight of the armature held verticaly and/or the source 30 connected to coil 19, is illustrative of means for applying to the floatingly mounted member a biasing force in the direction to press it against the eye for determining the average force with which said member is pressed against the eye. The elements 23, 24 and 19 are illustrative of means for applying to the armature member an oscillating force of a peak value less than that of said biasing force for cyclically vibrating said member in contact with the eye; and the elements 10, 11 constitute and illustrate means responsive to the frequency of oscillation of said member of predetermined mass so pressed against the eye, for generating said oscillating force at the natural resonant frequency of the armature pressed against the eye; while the elements 25, 26 are illustrative of any suitable means for measuring the effective dynamic spring constant of the eye, e.g. by measuring the frequency of the oscillating force proportional thereto and in turn proportional to the intraocular pressure.

The invention herein disclosed and various tests thereof have been described in a paper entitled "Acoustic Probe for Intraocular Pressure Measurement" presented and published at the Fourth International Congress on Acoustics, Copenhagen, 21–28 August 1962 within the year next preceding the filing of the present application.

I claim:
1. Apparatus for measuring intraocular pressure comprising, in combination:
   (a) a floatingly mounted member of predetermined mass formed to be placed against a generally spherical surface of the eye,
   (b) means for applying to said member a biasing force in the direction to press it against the eye for determining the average force with which said member is pressed against the eye,
   (c) regenerative means for applying to said member an oscillating force of a peak value less than that of said biasing force for cyclically virbating said member in contact with the eye,
   (d) said regenerative means comprising means responsive to the natural frequency of oscillation of said member of predetermined mass so pressed against the eye and means controlled by said frequency responsive means for generating said oscillating force at the natural resonant frequency of said mass pressed against said eye, and
   (e) means for measuring the frequency of said oscillating force as a measure of the intraocular pressure of the eye.

2. Apparatus for measuring intraocular pressure comprising, in combination:
   (a) a casing,
   (b) an armature slidably mounted in said casing,
   (c) said armature having a tip projecting from said casing to be placed against the eye,
   (d) said armature comprising a soft iron element and a magnet element spaced therefrom,
   (e) a driving coil partly surrounding said soft iron element energizable for moving said armature to project its tip toward the eye,
   (f) means for applying an oscillating current to said driving coil,
   (g) a pick-up coil surrounding said magnet for detecting the frequency of oscillation of said magnet,
   (h) means for adjusting the rate of oscillation of said oscillating current to match the natural resonant frequency of oscillation of said armature pressed against said eye, said means comprising a closed loop feedback from said pick-up coil to said driving coil via said means (f), and
   (i) means for measuring the frequency of the signal picked up by said pick-up coil.

3. Apparatus according to claim 2, said closed loop feedback comprising a limiter for limiting the peak excursions of said oscillating current.

4. Apparatus according to claim 3, further comprising means for applying to said driving coil a unidirectional current greater in value than the peak excursions of said oscillating current and of a direction to maintain said oscillating armature pressed against the eye.

References Cited by the Examiner

UNITED STATES PATENTS

| | | | |
|---|---|---|---|
| 3,070,087 | 12/1962 | Sittel | 128—2 |
| 3,192,765 | 7/1965 | Keiper | 73—80 |

RICHARD C. QUEISSER, *Primary Examiner.*

SIMON BRODER, *Examiner.*

J. J. SMITH, *Assistant Examiner.*